United States Patent
Parker et al.

(10) Patent No.: US 7,617,776 B1
(45) Date of Patent: Nov. 17, 2009

(54) SELECTIVE EMITTING FLARE NANOSENSORS

(75) Inventors: William P. Parker, Waitsfield, VT (US); Thomas F. A. Bibby, St. Albans, VT (US)

(73) Assignee: Diffraction, Ltd.

(*) Notice: Subject to any disclaimer, the term of this patent is extended or adjusted under 35 U.S.C. 154(b) by 230 days.

(21) Appl. No.: 10/483,754

(22) Filed: Sep. 27, 2004

(51) Int. Cl.
*F42B 4/26* (2006.01)
*F21K 2/06* (2006.01)

(52) U.S. Cl. ......................................... 102/336; 362/34
(58) Field of Classification Search ......... 102/336–345; 362/34, 84, 253
See application file for complete search history.

(56) References Cited

U.S. PATENT DOCUMENTS

| | | | | |
|---|---|---|---|---|
| 2,530,454 A * | 11/1950 | Fieser et. al. | ................. | 102/341 |
| 2,789,467 A * | 4/1957 | Rosenthal | ..................... | 89/1.1 |
| 2,864,311 A * | 12/1958 | Loedding | ..................... | 102/336 |
| 2,958,277 A * | 11/1960 | Snelling | ..................... | 102/364 |
| 3,150,848 A * | 9/1964 | Lager | .......................... | 244/3.16 |
| 3,524,409 A * | 8/1970 | Griffith | ........................ | 102/343 |
| 3,576,987 A * | 5/1971 | Voight et al. | ................... | 362/34 |
| 3,683,815 A * | 8/1972 | Shaffer | ....................... | 102/368 |
| 3,744,418 A * | 7/1973 | Tyroler | ....................... | 102/338 |
| 3,774,022 A * | 11/1973 | Dubrow et al. | ................. | 362/34 |
| 3,970,003 A * | 7/1976 | Hayward et al. | ............. | 102/336 |
| 3,974,774 A * | 8/1976 | Schaffner et al. | ........... | 102/365 |
| 4,299,166 A * | 11/1981 | Carignan et al. | ............. | 102/501 |
| 4,351,240 A * | 9/1982 | McCubbin et al. | ........... | 102/364 |
| 4,379,320 A * | 4/1983 | Mohan et al. | .................. | 362/34 |
| 4,706,568 A * | 11/1987 | Lundwall et al. | ............. | 102/513 |
| 4,815,386 A * | 3/1989 | Dillard et al. | ................ | 102/364 |
| 5,331,897 A * | 7/1994 | Handler | ...................... | 102/341 |
| 5,508,893 A * | 4/1996 | Nowak et al. | .................. | 362/34 |
| 5,561,260 A * | 10/1996 | Towning et al. | .............. | 102/336 |
| 5,631,441 A * | 5/1997 | Briere et al. | ................. | 102/336 |
| 5,671,998 A * | 9/1997 | Collet | ......................... | 362/101 |
| 5,783,768 A * | 7/1998 | Jacobson | ..................... | 102/334 |
| 5,866,840 A * | 2/1999 | Briere et al. | ................. | 102/336 |
| 6,055,909 A * | 5/2000 | Sweeny | ....................... | 102/336 |
| 6,235,148 B1 * | 5/2001 | Courson et al. | ........... | 156/379.6 |
| 6,253,680 B1 * | 7/2001 | Grubelich | ..................... | 102/334 |
| 6,364,499 B1 * | 4/2002 | Jones | .......................... | 362/109 |
| 6,497,181 B1 * | 12/2002 | Manole et al. | ............... | 102/513 |
| 6,666,351 B1 * | 12/2003 | Hartz et al. | ................... | 221/258 |
| 6,931,993 B1 * | 8/2005 | Manole et al. | ............... | 102/458 |
| 6,990,905 B1 * | 1/2006 | Manole et al. | ............... | 102/513 |
| 2003/0137826 A1 * | 7/2003 | Nomiyama | .................. | 362/34 |
| 2003/0205126 A1 * | 11/2003 | O'Neill | ....................... | 89/1.11 |
| 2004/0141310 A1 * | 7/2004 | Fujita | ........................... | 362/34 |

FOREIGN PATENT DOCUMENTS

| | | | |
|---|---|---|---|
| EP | 531727 A1 * | 3/1993 | |
| FR | 2684745 A1 * | 6/1993 | |
| GB | 2013704 A * | 8/1979 | |

* cited by examiner

*Primary Examiner*—Troy Chambers
(74) *Attorney, Agent, or Firm*—Mark G. Lappin; Elizabeth E. Powers

(57) ABSTRACT

A flare includes an air-tight rupturable capsule and an energy releasing material, contained within the air-tight rupturable capsule, such that the energy-releasing material releases energy in response to exposure to at least one component of air.

10 Claims, 5 Drawing Sheets

SELECTIVE EMITTING FLARE NANOSENSORS

TECHNICAL FIELD

This invention generally relates to pressure sensitive flares and, more particularly, to pressure sensitive flares that provide light outside of the visible spectrum.

BACKGROUND

When covertly monitoring people and/or places, ease of configuration/deployment of surveillance devices and materials is paramount. Ideally, surveillance devices/materials should be quick to deploy and require a minimal amount of configuration. Further, as covert monitoring devices only achieve their intended purpose if the party being monitored is unaware of their use, the surveillance device/material should easily blend in with their surroundings. Unfortunately, surveillance devices are often difficult to deploy, in that they require a considerable amount of time to set up/remove and often require the use of external power sources.

SUMMARY OF THE DISCLOSURE

According to an aspect of this disclosure, a flare includes an air-tight rupturable capsule and an energy releasing material, contained within the air-tight rupturable capsule. The energy-releasing material releases energy in response to exposure to at least one component of air.

One or more of the following features may also be included. The at least one component of air may be chosen from the group consisting of: water vapor, nitrogen; oxygen; carbon dioxide; and hydrogen. The air-tight rupturable capsule may be constructed of a glass material, a plastic material, and/or a cellulose material.

The flare may include a rupture assistance device, positioned within the air-tight rupturable capsule, configured to perforate the air-tight rupturable in response to an external force acting upon an external surface of the air-tight rupturable capsule. The rupture assistance device may be constructed of a metallic material, and/or a plastic material. The energy may be released within the infrared spectrum, the ultraviolet spectrum and/or the visible spectrum.

The energy-releasing material may include a material exhibiting air-initiated exothermic reactions. The energy-releasing material further may include a temperature sensitive oxidizer. The energy-releasing material further may include a moderator, such as activated charcoal. The material exhibiting air-initiated exothermic reactions may be a mixture of iron powder, salt, activated charcoal, cellulose and water. The material exhibiting air-initiated exothermic reactions may include white phosphorous.

The energy-releasing material may include a material exhibiting air-initiated chemoluminescent reactions, such as a mixture of N5-alkyl-1,5-dihydroflavins and an aldehyde.

According to another aspect of this disclosure, a flare includes an air-tight rupturable capsule, and a rupture assistance device, positioned within the air-tight rupturable capsule, configured to perforate the air-tight rupturable in response to an external force acting upon an external surface of the air-tight rupturable capsule. An energy-releasing material is contained within the air-tight rupturable capsule, such that the energy-releasing material releases energy within the infrared spectrum in response to exposure to at least one component of air.

According to another aspect of this disclosure, a flare includes a flexible casing and a pressure-sensitive luminescent material positioned within the flexible casing, such that the pressure-sensitive luminescent material is configured to release energy in response to an external force acting upon an external surface of the flexible casing.

According to another aspect of this disclosure, a flare includes a flexible casing, and a pressure-sensitive luminescent material positioned within the flexible casing, such that the pressure-sensitive luminescent material is configured to quickly release energy in response to an external force acting upon an external surface of the flexible casing. A phosphorescence material is positioned within the flexible casing and proximate the pressure-sensitive luminescent material, such that the phosphorescence material is configured to store at least a portion of the energy quickly released by the pressure-sensitive luminescent material and subsequently slowly release the stored energy.

One or more of the following features may also be included. The pressure-sensitive luminescent material may include a pressure-sensitive triboluminescent material, such as: europium tetrakis (dibenzoylmethide)-triethylammonium; and/or neodymium tetrakis (dibenzoylmethide)-triethylammonium.

The flexible casing may be at least partially constructed of a flexible polymer matrix, a silicone compound, a urethane compound and/or an epoxy compound. The flexible casing may be a multilayer flexible casing that may include alternating layers of pressure-sensitive luminescent material and phosphorescence material. The flexible casing may be configured to channel the energy slowly released from the phosphorescence material to one or more periphery edges of the flexible casing.

The flare may include initiation crystals positioned proximate the pressure-sensitive luminescent material, such that the external force acting upon the external surface of the flexible casing results in physical contact between at least one of the initiation crystals and at least one of the pressure-sensitive luminescent material, and initiates the quick release of energy by the pressure-sensitive luminescent material. The energy slowly released by the phosphorescence material may be released in the infrared spectrum, the ultraviolet spectrum and/or the visible spectrum.

According to another aspect of this disclosure, a flare includes an explosive initiator configured to quickly release energy in response to an external force acting upon the explosive initiator, and a combustible flare, positioned proximate the explosive initiator, configured to be ignited by the energy quickly released by the explosive initiator and subsequently slowly release energy due to controlled combustion of combustible flare.

One or more of the following features may also be included. The explosive initiator may be a nitrogen-based explosive compound, such as: nitrogen triiodide; silver fulminate; a fulminate compound; a picrate compound; an azide compound; and/or a carbide salt compound. The combustible flare may include a mixture of potassium perchlorate and sugar and/or a maltose octanitrate compound.

The explosive initiator may include a combustible booster portion (e.g., a double base gunpowder) configured to be ignited by and subsidize the energy quickly released by the explosive initiator. The explosive initiator may encapsulate the combustible flare. The energy slowly released by the combustible flare may be released in the infrared spectrum, the ultraviolet spectrum and/or the visible spectrum.

According to another aspect of this disclosure, a flare includes an explosive initiator configured to quickly release energy in response to an external force acting upon the explosive initiator, and a combustible flare, positioned proximate the explosive initiator, configured to be ignited by the energy quickly released by the explosive initiator and subsequently slowly release energy due to controlled combustion of combustible flare. The explosive initiator, which encapsulates the combustible flare, includes a combustible booster portion configured to be ignited by and subsidize the energy quickly released by the explosive initiator.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
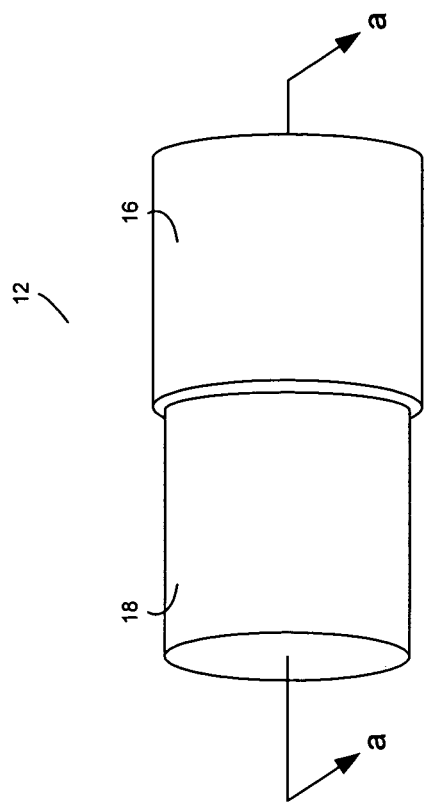
FIG. 1 is an isometric view of a flare.
Figure 2:
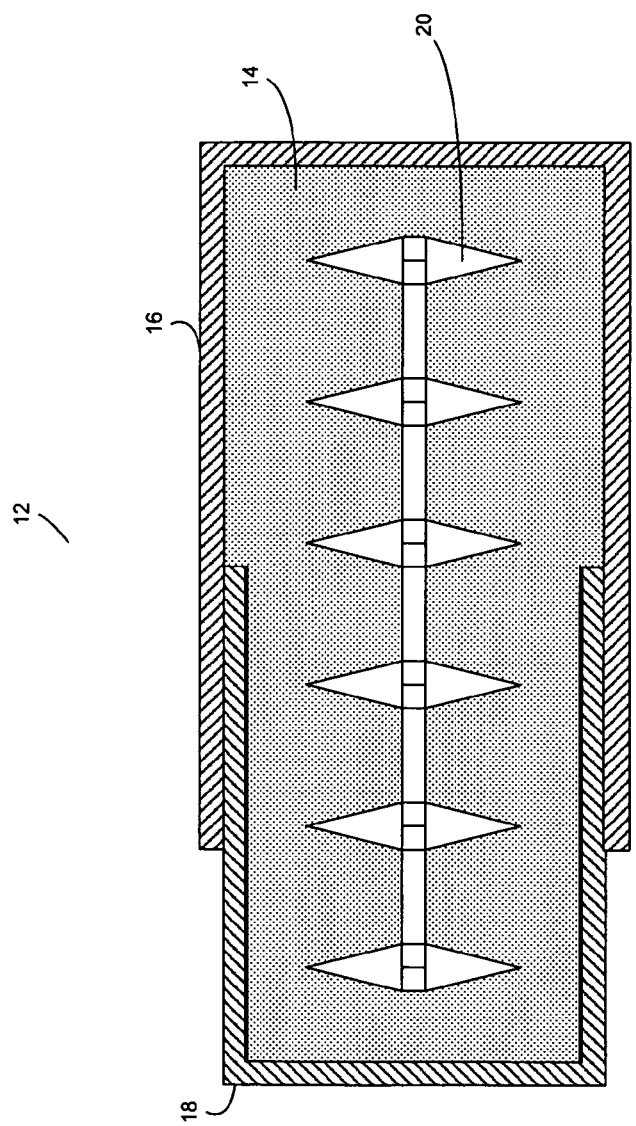
FIG. 2 is a cross-sectional side-view (along section line a-a) of the flare of FIG. 1.

Referring to FIGS. 1 and 2, there is shown a flare 10 that includes an air-tight rupturable capsule 12 for containing an energy releasing material 14 that releases energy in response to exposure to at least one component of air (e.g., water vapor, nitrogen; oxygen; carbon dioxide; and/or hydrogen). An example of such an energy-releasing material is a mixture of chemicals that generate an exothermic reaction when combined with gaseous oxygen e.g., a mixture of iron powder, salt, activated charcoal, cellulose and water which reacts with the oxygen present in atmospheric air and produces infrared radiation (heat) for approximately 120 minutes. Other examples of energy releasing materials that react with air to release energy include white phosphorous, and an oxygen catalyzed chemiluminescent compound such as N5-alkyl-1, 5-dihydroflavins and an aldehyde or the reaction between luciferase and luciferin.

Air-tight rupturable capsule 12, which may be constructed from glass, a plastic or cellulose material, typically includes two pieces (e.g., pieces 16, 18) that are sized such that an air-tight seal is formed between the two pieces when they are pressed together. Air-tight rupturable capsule is configured such that an external force acting upon the surface of air-tight rupturable capsule 12 results in the capsule rupturing, and energy-releasing material 14 being exposed to atmospheric air. This results in a chemical reaction between energy-releasing material 14 and the atmospheric air, and the subsequent release of energy. This energy is typically in the form of ultraviolet, visible, or infrared light.

When designing flare 10, the material from which air-tight rupturable capsule 12 is constructed will varying depending on the desired "trigger-level" of the external force acting on the flare. As flare 10 is typically used to covertly monitor the movement of a subject, the weight of the subject being monitored should be taken into consideration when designing flare 10. For example, by placing flares 10 on a roadway or a trail, the movement of object along the roadway/trail can be monitored. Specifically, when the object steps on (if a person) or rolls over (if a vehicle) the flare, the air-tight rupturable capsule should rupture, resulting in a chemical reaction between one or more components of the air and energy-releasing material 14.

As discussed above, this chemical reaction typically results in the release of energy in the form of e.g., infrared radiation, ultraviolet radiation, and/or visible light. In the event of visible light being released, which is capable of being seen with the naked eye, no special equipment is required. However, if infrared or ultraviolet radiation is released, specialized equipment (e.g., night-vision goggles, silicon photodetector, or thermal imager, not shown) are required to see the released energy, as it is not visible to the naked eye.

Continuing with the above-stated example, if it is desired to monitor any and all movement along a roadway, air-tight rupturable capsule 12 should be sized such that capsule 12 would rupture when exposed to the minimum force to be likely encountered. Therefore, if used in a military application and troop movement is to be monitored, air-tight rupturable capsule 12 should be configured such that the force applied by a one-hundred to one-hundred-fifty pound person ruptures capsule 12. However, if the person monitoring the movement is not interested in troop movement and only interested in monitoring the movement of heavy-equipment (e.g., tanks and armored personal carriers, for example), the air-tight rupturable capsule may be configured such that only forces applied by an object in excess of one-thousand pounds ruptures the air-tight rupturable capsule 12. Accordingly, air-tight rupturable capsule 12 may be constructed out of a material that is thicker and more resilient.

A rupture assistance device 20 may be included within air-tight rupturable capsule 12 to assist in rupturing capsule 12 when the external force acts upon flare 10. Rupture assistance device 20 may be constructed from a plastic or a metallic material and may be in the form of e.g., a twisted piece of wire (not shown) or a barbed object (as shown), for example. Therefore, when the external force acts upon flare 10, once air-tight rupturable capsule 10 is deflected enough so that a portion of the capsule contacts rupture assistance device 20, a portion of rupture assistance device 20 would perforate air-tight rupturable capsule 12, thus initiating the chemical reaction.

As discussed above, flare 10 may be used to covertly monitor the movement of a subject. If such covert monitoring is desired, air-tight rupturable capsule 10 should be configured to blend in with its anticipated surroundings. For example, if flare 10 is going to be used on paved roadways, air-tight rupturable capsule 12 may be configured to look similar to loose pieces of asphalt. Alternatively, if flare 10 is going to be used to monitor movement on roadways in arid climates, air-tight rupturable capsule 12 may be configured to look similar to loose pieces of sand or dirt. Further, if flare 10 is going to be used to monitor movement on trails, air-tight rupturable capsule 12 may be configured to look like organic matter (e.g., animal droppings, seeds, or grains, for example).

Figure 4:
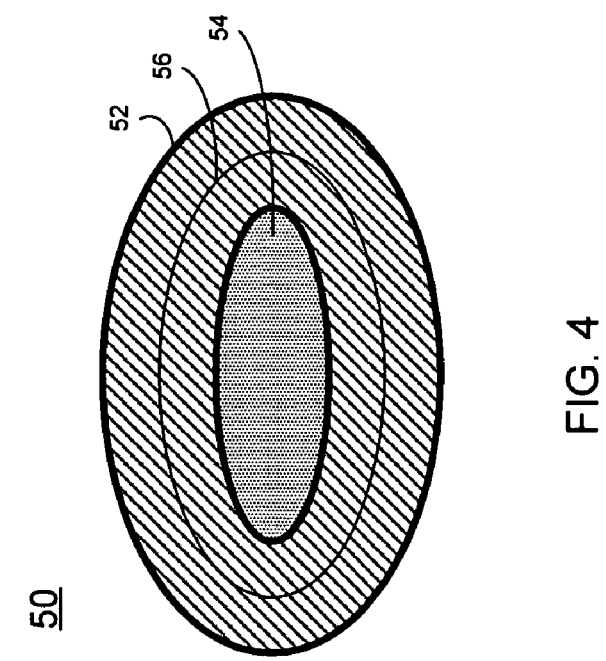
FIG. 4 is a cross-sectional end-view (along section line b-b) of the flare of FIG. 3.
Figure 3:
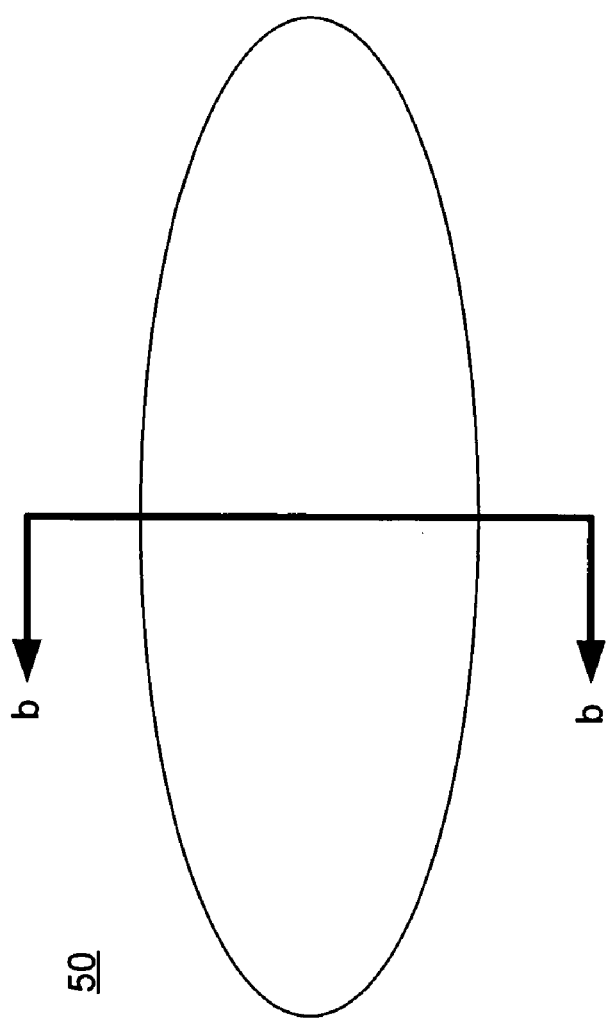
FIG. 3 is a diagrammatic view of a flare.

Referring to FIGS. 3 and 4, there is shown a flare 50 that includes an explosive initiator 52 and a combustible flare 54. Explosive initiator 52 is configured to quickly release energy in response to an external force acting upon flare 50. As with the flare discussed above, that external force may include e.g., a person stepping on flare 50 and/or a vehicle rolling over flare 50, for example. Explosive initiator 50 is typically constructed of a nitrogen-based explosive, such as nitrogen-tri-iodide or silver fulminate.

Combustible flare 54, which in this particular embodiment is encapsulated by explosive initiator 52, is configured to be ignited by the energy quickly released by explosive initiator 52. Further, once ignited, combustible flare 54 is configured to burn for an extend period of time (e.g., 0.3 to 30 seconds) and slowly release energy. The energy released may be in the form of e.g., infrared radiation, ultraviolet radiation, and/or visible light. In the event of visible light being released, which is capable of being seen with the naked eye, no special equipment is required. However, if infrared or ultraviolet radiation is released, specialized equipment (e.g., night-vision goggles or thermal imager, not shown) are required to see the released energy, as it is not visible to the naked eye. Combustible flare 54 may be constructed of e.g., a potassium perchlorate and sugar mixture or a maltose octanitrate compound, for example.

To assist in the ignition of combustible flare 54, explosive initiator 52 may include a booster stage 56 that is easier to ignite than combustible flare 54. Therefore, the energy quickly released due to an external force acting upon explosive initiator 52 may be used to ignite booster stage 56, that: subsidizes the energy produced by explosive initiator 52; provides energy for a longer duration (e.g., 50 milliseconds) than explosive initiator 52; and easily ignites combustible flare 54. Typically, booster stage 56 is constructed using double base gunpowder (i.e., nitrocellulose grains treated with nitroglycerin and/or an oxidizer).

As with the above-described flare, flare 50 may be used to covertly monitor the movement of a subject. If such covert monitoring is desired, flare 50 may be configured to blend with its anticipated surroundings and resemble e.g., loose pieces of asphalt, loose pieces of sand or dirt, and/or organic matter (e.g., animal droppings, seeds, or grains, for example).

Figure 5:
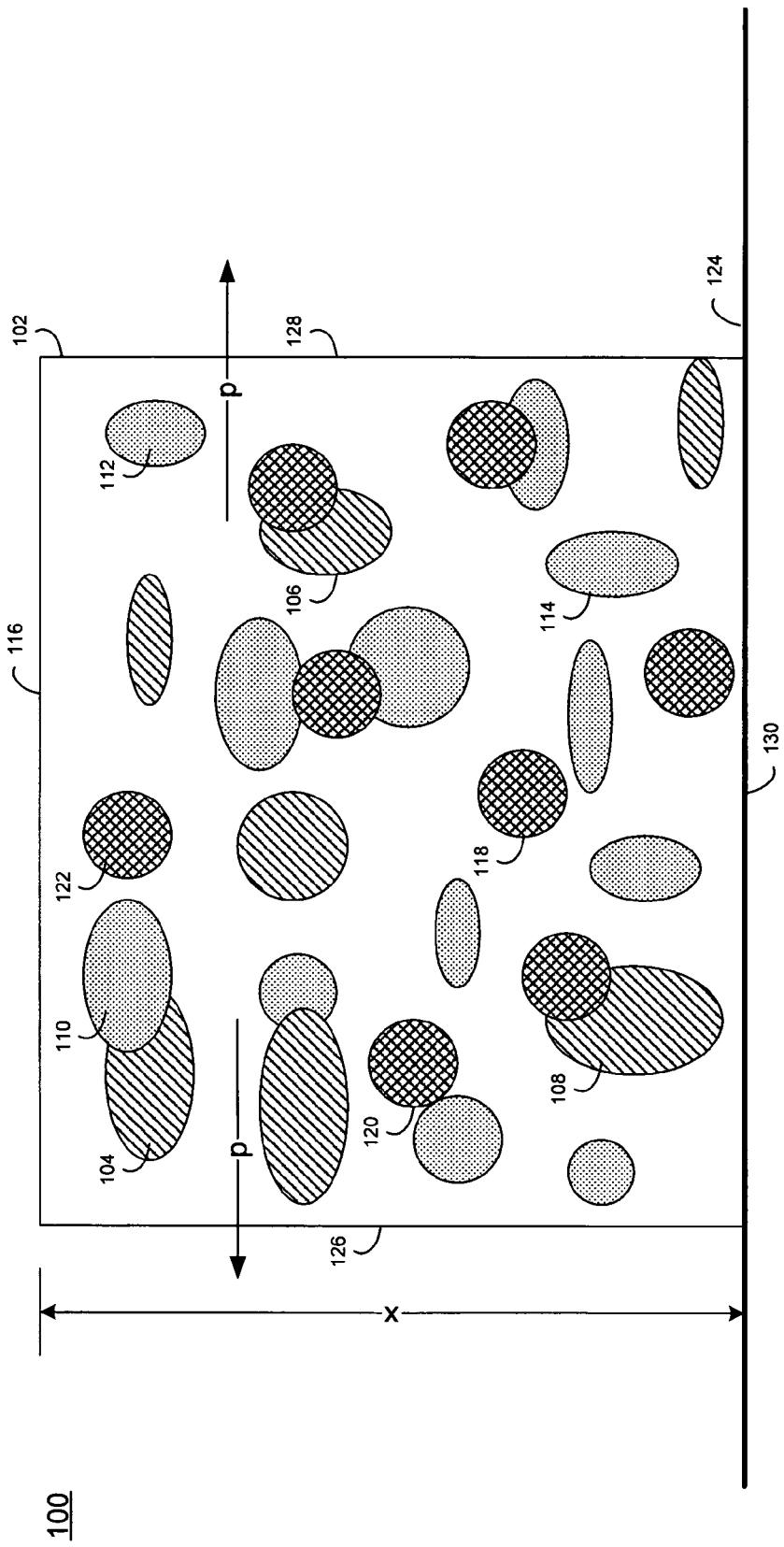
FIG. 5 is a diagrammatic view of a flare.

Referring to FIG. 5, there is shown a flare 100 that includes a flexible casing 102 into which pressure-sensitive luminescent material (e.g., particles 104, 106, 108) and phosphorescence material particles (e.g., particles 110, 112, 114) are embedded.

Pressure sensitive luminescent (triboluminescent) material 104, 106, 108 is configured to quickly release energy in response to an external force acting upon an external surface (e.g., surface 116) of flexible casing 102. As described above, that external force may include e.g., a person stepping on flare 100 and/or a vehicle rolling over flare 100, for example. Flexible casing 102 may be constructed of a resilient material that is sufficiently pliable to allow for an external force acting on the flexible casing to be transferred to luminescent material 104, 106, 108. Examples of the type of material from which flexible casing 102 may be constructed include e.g., a flexible polymer matrix, a silicone compound, a urethane compound or an epoxy compound, for example.

Examples of pressure sensitive luminescent material 104, 106, 108 include e.g., europium tetrakis (dibenzoylmethide)-triethylammonium, neodymium tetrakis (dibenzoylmethide)-triethylammonium, N-isopropylcarbazole and other pressure-sensitive triboluminescent materials.

As is may be possible for flexible casing 102 to be sufficient pliable to effectively isolate luminescent material 104, 106, 108 from the external force acting upon flexible casing 102 (resulting in luminescent material 104, 106, 108 not quickly releasing energy), initiation crystals 118, 120, 122 may also be embedded in flexible casing 102 to enhance the sensitivity of the luminescent material 104, 106, 108 to external forces acting upon casing 102. Specifically, by embedding initiation crystals (e.g., grains of quartz sand, for example) into flexible casing 102 proximate luminescent material 104, 106, 108, the likelihood of luminescent material 104, 106, 108 reacting to external forces is increased as deflection of casing 102 (due to the external force) may result in luminescent material 104, 106, 108 physically contacting the initiation crystals 118, 120, 122, resulting in the quick release of energy by the luminescent material 104, 106, 108.

A portion of the energy quickly released by the luminescent material 104, 106, 108 is stored by the phosphorescence material 110, 112, 114, and this stored energy is subsequently slowly released. The energy released may be in the form of e.g., infrared radiation, ultraviolet radiation, and/or visible light. In the event of visible light being released, which is capable of being seen with the naked eye, no special equipment is required. However, if infrared or ultraviolet radiation is released, specialized equipment (e.g., night-vision goggles or silicon photo detector, not shown) are required to see the released energy, as it is not visible to the naked eye.

As there is a physical thickness ("x") associated with casing 102, the object (e.g., a foot or a tire, for example) exerting the external force on surface 116 of casing 102 will be spaced a physical distance above the surface 124 onto which flare 100 is placed. Therefore, the energy slowly released by phosphorescence material 110, 112, 114 will illuminate (i.e., light "p" will be able to escape) one or more periphery edges 126, 128 of casing 102, even though upper surface 116 and lower surface 130 of casing 102 are obscured by the object exerting the force (not shown) and the surface 124 on which casing 102 is placed (respectively).

Figure 6:
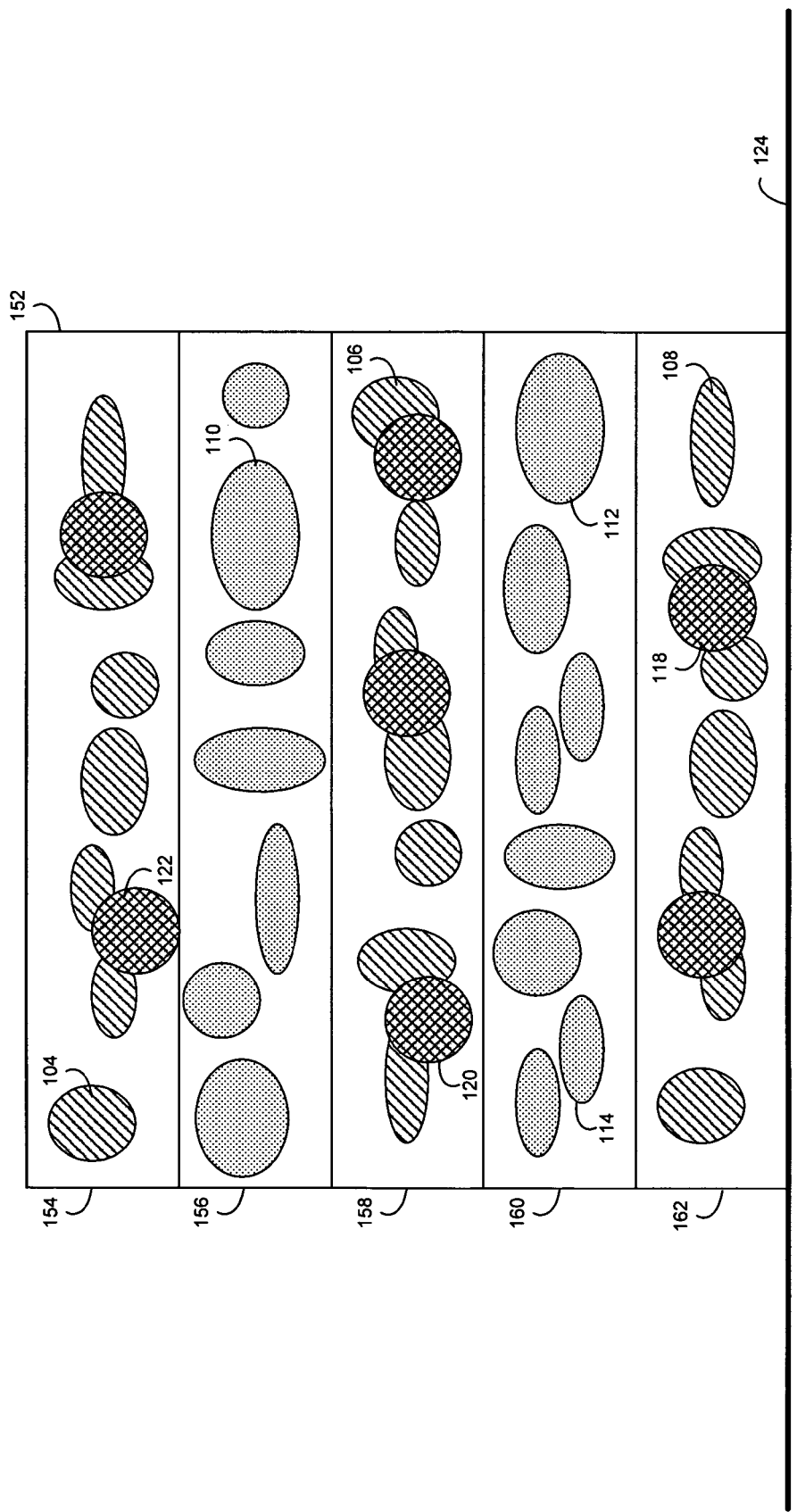
FIG. 6 is a diagrammatic view of an alternative embodiment of the flare of FIG. 5.

Referring to FIG. 6, there is shown a flare 150, which is an alternative embodiment of flare 100 (FIG. 4). Concerning flare 150, flexible casing 152 includes multiple layers 154, 156, 158, 160, 162, which alternate between luminescent layers 154, 158, 162 (i.e., layers containing luminescent material 104, 106, 108) and phosphorescence layers 156, 160 (i.e., layers containing phosphorescence material 110, 112, 114). As with the above-described embodiment, initiation crystals 118, 120, 122 may be embedded within luminescent layers 154, 158, 162 to assist in the excitation of luminescent material 104, 106, 108

As with the above-described flares, flare 100, 150 may be used to covertly monitor the movement of a subject. If such covert monitoring is desired, flares 100, 150 may be configured to blend with its anticipated surroundings and resemble e.g., loose pieces of asphalt, loose pieces of sand or dirt, and/or organic matter (e.g., animal droppings, seeds, or grains, for example).

While air-tight rupturable capsule 12 is described above as being constructed of two pieces, other configurations are possible. For example, a single piece capsule may be employed in which the energy releasing material is injected inside of the capsule and subsequently sealed.

While combustible flare 54 is described above as being encapsulated by explosive initiator 52, other configurations are possible. For example, combustible flare 54 may be a separate entity with respect to explosive initiator 52, provided combustible flare 54 is sufficiently close enough to explosive initiator 52 so that combustible flare 54 is ignited upon ignition of explosive initiator 52.

A number of implementations have been described. Nevertheless, it will be understood that various modifications may be made. Accordingly, other implementations are within the scope of the following claims.

What is claimed is:

1. A flare comprising:
   an air-tight rupturable capsule; and
   an energy-releasing material, contained within the air-tight rupturable capsule, wherein the energy-releasing material releases energy in response to exposure to at least one component of air,
   wherein the energy-releasing material includes a material exhibiting air-initiated exothermic reactions, and wherein the material exhibiting air-initiated exothermic reactions is a mixture of iron powder, salt, activated charcoal, cellulose and water.

2. A flare comprising:

an air-tight rupturable capsule;

a rupture assistance device, positioned within the air-tight rupturable capsule, configured to perforate the air-tight rupturable capsule in response to an external force acting upon an external surface of the air-tight rupturable capsule; and an energy-releasing material, contained within the rupturable capsule, wherein the energy-releasing material releases energy within the infrared spectrum in response to exposure to at least one component of air.

3. A flare comprising:

an air-tight rupturable capsule;

an energy-releasing material, contained within the air-tight rupturable capsule, wherein the energy-releasing material releases energy in response to exposure to at least one component of air; and a rupture assistance device, positioned within the air-tight rupturable capsule, configured to perforate the air-tight rupturable capsule in response to an external force acting upon an external surface of the air-tight rupturable capsule.

4. The flare of claim 3 wherein the at least one component of air is chosen from the group consisting of water vapor; nitrogen; oxygen; carbon dioxide; and hydrogen.

5. The flare of claim 3 wherein the rupture assistance device is constructed of a plastic material.

6. The flare of claim 3 wherein the energy is released within the infrared spectrum.

7. The flare of claim 3 wherein the energy-releasing material includes a material exhibiting air-initiated exothermic reactions.

8. The flare of claim 7 wherein the energy-releasing material further includes a temperature sensitive oxidizer.

9. The flare of claim 7 wherein the energy-releasing material further includes a moderator.

10. The flare of claim 9 wherein the moderator is activated charcoal.

* * * * *